Nov. 14, 1967  D. A. ROSSI  3,352,524
REMOTELY ADJUSTABLE REAR VIEW MIRROR
Filed Dec. 23, 1965  2 Sheets-Sheet 1
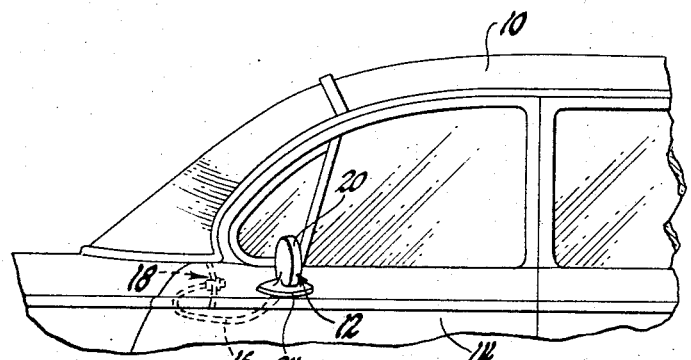
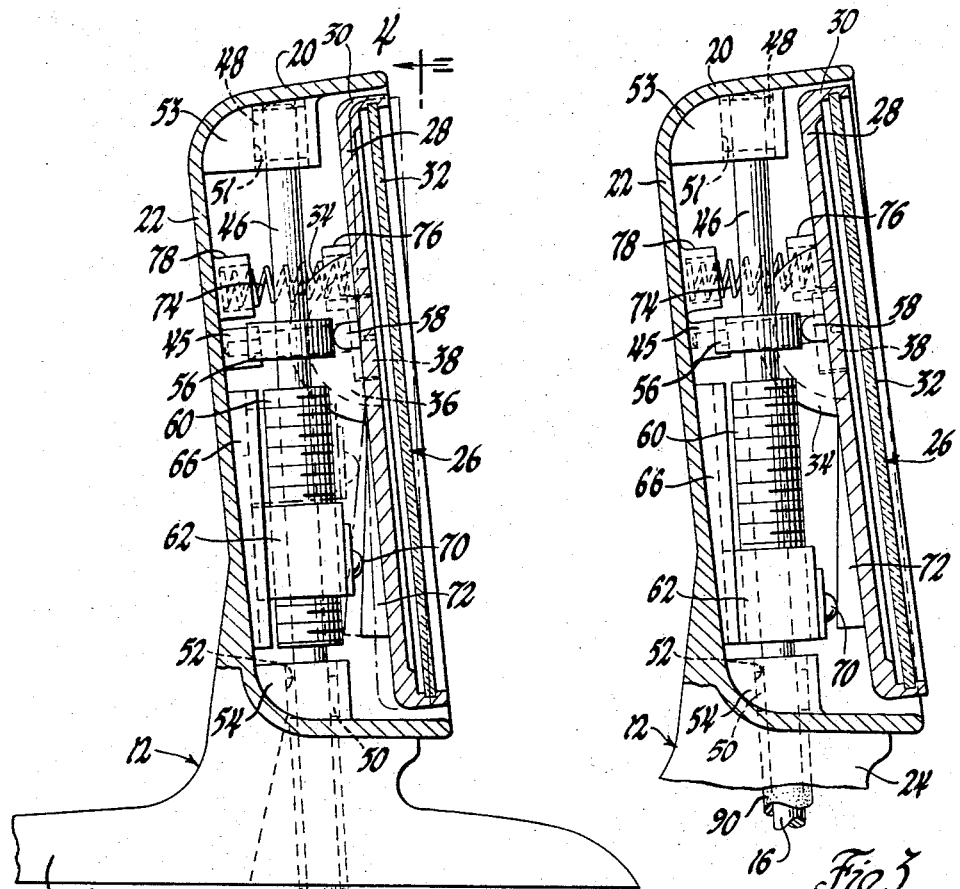
INVENTOR.
David A. Rossi
BY
E. J. Biskup
ATTORNEY Nov. 14, 1967  D. A. ROSSI  3,352,524
REMOTELY ADJUSTABLE REAR VIEW MIRROR
Filed Dec. 23, 1965  2 Sheets-Sheet 2
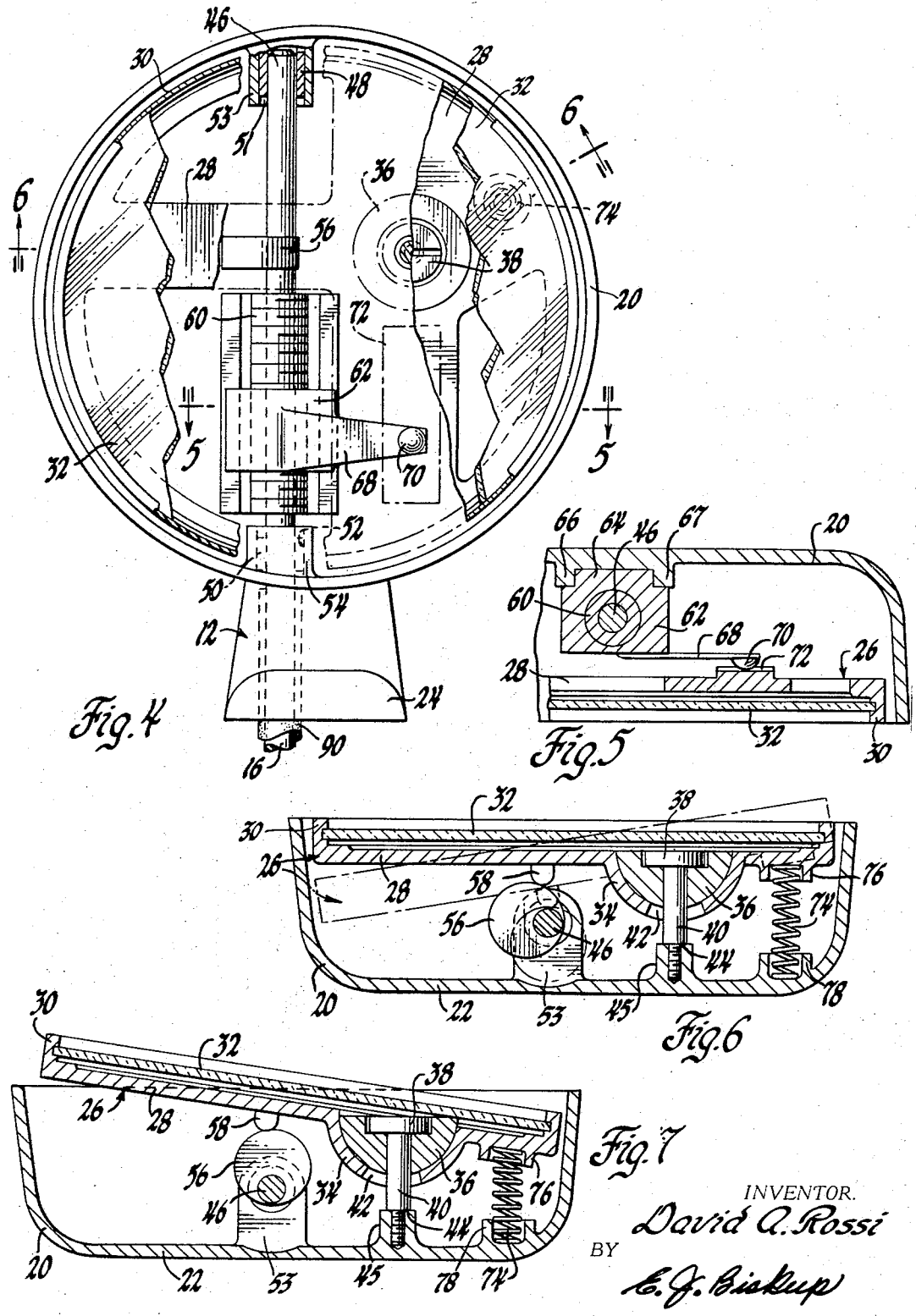
INVENTOR.
David A. Rossi
BY
E. J. Biskup
ATTORNEY Patented Nov. 14, 1967

3,352,524
REMOTELY ADJUSTABLE REAR VIEW MIRROR
David A. Rossi, New Baltimore, Mich., assignor to General Motors Corporation, Detroit, Mich., a corporation of Delaware
Filed Dec. 23, 1965, Ser. No. 515,982
6 Claims. (Cl. 248—278)

ABSTRACT OF THE DISCLOSURE

A remotely adjustable rear view mirror wherein a mirror support is universally pivotally supported eccentrically within a housing. A shaft, rotatably supported within the housing, includes a pair of cam members adapted to rotate the mirror support about horizontal and vertical axes when the shaft is remotely rotated by means of an actuator knob located interior of the vehicle. For each revolution of the actuator knob, the mirror support makes a complete oscillation about the vertical axis while rotating a predetermined amount about the horizontal axis.

---

It has become desirable to provide present day motor vehicles with a remotely adjustable outside rear view mirror which may be adjusted by the operator while he is seated within the vehicle. Such mirrors are desirable because of the convenience they offer and because of the safety factor involved in having a mirror which can be instantly and accurately adjusted from within the vehicle to give the operator a clear view to the rear of his vehicle. Such a mirror mechanism typically includes a mirror support which is angularly adjustable about horizontal and vertical axes through one or more flexible cables controlled by an actuator located within the vehicle passenger compartment.

A remotely adjustable rear view mirror according to the present invention includes a housing mountable on the vehicle exterior sheet metal and a mirror support which is universally pivotally supported eccentrically on the housing. A shaft is rotatable within the housing and behind the mirror support and cooperating camming means formed on the shaft and the facing inner surface of the mirror support serve to angularly position the mirror support about horizontal and vertical axes as the shaft is rotated. The shaft is caused to rotate by means of a manually operable actuator conveniently located within the vehicle passenger compartment, rotational movement of the actuator being transmitted to the shaft through a flexible cable.

One feature of the present invention is that the mirror support is positively angularly positioned about horizontal and vertical axes by pairs of cooperating camming means which are driven by a common shaft.

Another feature of this invention is that rotational movement of the common shaft is controlled by a remotely located actuator connected to the shaft by a single flexible cable.

Still another feature of this invention is that the mirror support is eccentrically pivotally supported on the housing thereby providing sufficient space between the housing and mirror support to accommodate the cooperating camming means and drive shaft.

A further feature of this invention is that the cooperating camming means are continuously and positively spring biased into engagement with each other.

A still further feature of this invention is that the mirror support is angularly positioned about a vertical axis by camming means which include a cam wheel rotatable with the shaft and a cam follower formed on the mirror support, and is angularly positioned about a horizontal axis by camming means which include a cam ramp formed on the mirror support and a cam member which moves axially upon the shaft as it rotates.

The features of the invention will be made apparent from the following detailed description with reference to the drawings wherein:

FIGURE 1 is a fragmentary view of a motor vehicle incorporating a remotely adjustable rear view mirror according to the present invention;

FIGURE 2 is an enlarged view of the rear view mirror partially in section showing the mirror support in one position;

FIGURE 3 is a view similar to FIGURE 2 showing the mirror support in another position;

FIGURE 4 is a partially broken away view taken generally along a plane defined by the line 4—4 of FIGURE 2;

FIGURE 5 is a section taken generally along a plane defined by the line 5—5 of FIGURE 4;

FIGURE 6 is a section taken generally along a plane defined by the line 6—6 of FIGURE 4; and FIGURE 7 is a view similar to FIGURE 6 showing the mirror support in another position.

Referring to FIGURE 1, there is shown a portion of a motor vehicle 10 having a remotely adjustable rear view mirror 12 according to the present invention which is mounted on the vehicle door 14. The mirror 12 is adjustable through a flexible cable 16 connected to a manually operable actuator 18 which is suitably secured inside the vehicle passenger compartment at a point convenient for the vehicle operator.

As shown in the drawings the mirror 12 includes an outer cylindrical housing 20 having a flat end plate 22 and a mounting bracket 24 by which the mirror is secured to the sheet metal of the door 14. A mirror support 26 is located within the housing 20 and, as best seen in FIGURES 6 and 7, includes an annular flat body portion 28 with an axially extending peripheral rim or lip 30 which is grooved about its inner surface to receive a mirror element 32. A spherical depression or socket 34 is formed in the surface of body portion 28 and receives a hemispherical ball segment 36 which is centrally drilled and counter-bored to receive the shouldered head 38 of a cap screw 40. The shank of the cap screw 40 extends through the drilled ball segment 36 and an appropriately sized aperture 42 in the socket 34 and has a shoulder 44 which seats on the outer surface of a boss 45 formed on the inner surface of the plate 22 at a point eccentric to the geometric center of the housing to locate the mirror support 26 within the housing 20. The socket 34 is freely movable about the hemispherical ball segment 36 so that the mirror support 26 is universally pivotally movable with respect to the housing 20. The eccentric attachment of the mirror support 26 to the housing 20 provides space between the mirror support and housing necessary to accommodate the mirror adjustment mechanism to be hereinafter described.

In order to positively angularly locate the mirror support 26 for the proper rear view, pairs of cooperating camming means are provided to position the mirror support about horizontal and vertical axes. The cooperating camming means are formed on the inner surface of the mirror support body portion 28 facing the plate 22 and on a rotatable shaft 46 located between the housing and mirror support. The shaft 46 is offset but generally parallel to a vertical plane passed axially through the center of the housing and is rotatable within bearings 48 and 50 which are held within axially aligned bores 51, 52 in bosses 53, 54 formed with the housing 20. A cam wheel 56 is eccentrically mounted for rotation with shaft 46 to drive a projection or cam follower 58 formed integrally with the mirror support 26. The cam wheel 56 and follower 58 comprise a first camming means which is generally located in a horizontal plane passing through the center of the pivotal socket 34 and is effective to angularly position the mirror support about a vertical axis. The shaft 46 additionally includes a threaded portion 60 upon which a nut 62 is received for axial movement along the shaft. The nut is prevented from rotating by an integral rib 64 which slidably moves within a groove defined by the parallel ribs 66, 67 formed on the plate 22. The nut 62 has an outwardly extending arm 68 which has a projection or cam member 70 at its outer end engageable with and movable relative to a cam ramp 72 formed integrally with the mirror support 26. This second camming means is generally located in a vertical plane passing through the center of the pivotal socket 34 and is effective to angularly position the mirror support about a horizontal axis. A compression spring 74 is seated within facing bosses 76 and 78 formed with the mirror support and housing respectively, and is located radially outward of the socket 34 and at a point about the mirror support where the spring biasing force will continuously and positively urge the cooperating camming members into engagement.

As seen in FIGURE 2, the actuator 18 for achieving relative movement of the camming members comprises a cylindrical member 80 and a manually operable knob 82 which have co-axial bores through which the flexible cable 16 is received. A reduced end portion 83 of the cable 16 is secured to the knob 82 by a set screw 84. A retainer ring 86 and nut 87 may be used to secure the actuator 18 to any convenient support 88 within the vehicle passenger compartment. The flexible cable 16 is protectively encased within a sheath 90 and extends from the actuator 18 to the mirror 12 where the second end portion of the flexible cable 16 is connected to the shaft 46 by any conventional method.

To adjust the mirror of this invention, the operator need only grasp the actuator knob 82 and rotate it in one direction or the other until the desired angular position of the mirror support 26 is realized. For instance, if the knob is rotated in a direction causing the nut 62 to move axially downward on the shaft 46, the cam member 70 will ride downwardly on the cam ramp 72 forcing the mirror support, against the biasing force of the spring 74, to pivot about a horizontal axis and assume the position shown in FIGURE 3. Conversely, if the cam member 70 is made to move upward on the cam ramp, as shown in phantom in FIGURE 2, the upper portion of the mirror support will be pivotally rotated outwardly about a horizontal axis by the biasing force of the spring 74. The adjustment of the mirror support about a horizontal axis during one revolution of the shaft will be relatively small and will be determined by the thread pitch which is selected for the threaded portion 60. Of course, during each revolution of the shaft 46, the cam wheel 56 also makes a complete revolution to drive the mirror between its horizontal limit positions about a vertical axis. It is thus obvious that for each incremental adjustment of the mirror support about a horizontal axis during one revolution of the shaft, the mirror support will pass through a complete range of adjustment about a vertical axis and that, accordingly, the mirror support may be positively and accurately adjusted to any desired position within the adjustment range of the mirror.

While a preferred embodiment of the invention has been shown and described, it will be understood that the invention includes any and all modifications falling within the scope of the following claims.

I claim:

1. A remotely adjustable rear view mirror comprising, a housing, a mirror support, means universally pivotally securing said mirror support eccentrically to the housing, a shaft rotatably supported in said housing and located between said housing and said mirror support, first cooperating camming means on said shaft and said mirror support for positioning said mirror support about a vertical axis, second cooperating camming means on said shaft and said mirror support for positioning said mirror support about a horizontal axis, means for biasing said first cooperating camming means and said second cooperating camming means into continuous engagement, a remotely located actuator for selectively positioning said mirror support about horizontal and vertical axes, and drive means interconnecting said shaft and said actuator through which rotational movement is transmitted to said shaft from said actuator.

2. The invention recited in claim 1 wherein the first cooperating camming means includes a cam wheel eccentrically mounted on said shaft and rotatable therewith and a cam follower located on said mirror support and engageable with said cam wheel.

3. The invention recited in claim 1 wherein said shaft includes a threaded portion and the second cooperating camming means includes a cam ramp on said mirror support and a cam member movable axially along said shaft threaded portion and engageable with and movable relative to said cam ramp.

4. The invention recited in claim 1 wherein said biasing means includes a compression spring located between said housing and said mirror support and radially outward from said securing means.

5. The invention recited in claim 1 wherein said first cooperating camming means and said second cooperating camming means are located in substantially perpendicular planes.

6. A remotely adjustable rear view mirror comprising, a housing, a mirror support universally pivotally connected to said housing at a point eccentric thereto, a shaft including a threaded portion rotatably supported in said housing and located between said housing and said mirror support, a cam wheel eccentrically mounted on said shaft and rotatable therewith, a cam follower located on said mirror support and engageable with said cam wheel, said cam wheel and said cam follower cooperating to position said mirror support about a vertical axis, a cam ramp on said mirror support, a cam member movable axially along said shaft threaded portion and engageable with and movable relative to said cam ramp, said cam ramp and said cam member cooperating to position said mirror support about a horizontal axis, said cam wheel and said cam follower located in a plane substantially perpendicular to the plane of said cam ramp and said cam member, a compression spring located between said housing and said mirror support radially outward from said point biasing said cam wheel and cam follower into continuous engagement, said compression spring concurrently biasing said cam ramp and said cam member into continuous engagement, a remotely located knob, a flexible cable having one end attached to said knob and a second end attached to said shaft, said knob manually rotatable to transmit rotational movement of said knob through said flexible cable to said shaft.

References Cited

UNITED STATES PATENTS

| | | | |
|---|---|---|---|
| 2,613,575 | 10/1952 | Falge | 248—481 |
| 2,664,785 | 1/1954 | Roehrig | 248—487 |
| 2,855,825 | 10/1958 | Feder | 74—501 |
| 2,987,962 | 6/1961 | Helka | 248—205 X |

JOHN PETO, *Primary Examiner.*